United States Patent [19]

Lee et al.

[11] Patent Number: 5,610,241
[45] Date of Patent: Mar. 11, 1997

[54] REACTIVE GRAFT POLYMER WITH BIODEGRADABLE POLYMER BACKBONE AND METHOD FOR PREPARING REACTIVE BIODEGRADABLE POLYMERS

[75] Inventors: Keun H. Lee; Chee Y. Won; Chih-Chang Chu, all of Ithaca, N.Y.

[73] Assignee: Cornell Research Foundation, Inc., Ithaca, N.Y.

[21] Appl. No.: 646,060

[22] Filed: May 7, 1996

[51] Int. Cl.$^6$ .................. C08G 63/08; C08G 63/685; C08G 63/91
[52] U.S. Cl. .................. 525/411; 525/54.11; 525/410; 525/413; 525/415; 528/354
[58] Field of Search .................. 525/54.11, 410, 525/411, 413, 415; 528/354

[56] References Cited

U.S. PATENT DOCUMENTS 5,219,980  6/1993  Swidler .................. 528/272

FOREIGN PATENT DOCUMENTS 4224401  1/1994  Germany.

OTHER PUBLICATIONS

Barrera, D. A., et al, Macromolecules, 28, 425–432 (1995).
Barrera, D. A., et al, J. Am. Chem. Soc. 115, 11010–11011 (1993).
Bodanszky, M., et al, The Practice of Peptide Synthesis, Springer–Verlag, New York (1984), pp. IX–XVII.
Bodanszky, M., Peptide Chemistry A Practical Textbook, 2nd edition, Springer–Verlag, New York (1993), pp. 24 and 56.
Cima, L. G., et al, Journal of Biomechanical Engineering 113, 143–151 (May 1991).

Hrkach, J. S., et al, Mat. Res. Soc. Symp. Proc., 394, 77–82 (1995).
Hrkach, J. S., et al, Macromolecules, 28, 4736–4739 (1995).
Leonard, J., et al, Advanced Practical Chemistry, Blackie Academic and Professional, New York (1995), 278–279.
Peacock, E. E., et al, Wound Repair, 2nd edition, W. B. Saunders Co., Philadelphia, 1976, p. 564.
Tsuruta, T., et al, Biomedical Applications of Polymeric Materials, CRC Press, Boca Raton, 168–169, 371–375 (1993).

*Primary Examiner*—David Buttner

[57] ABSTRACT

Graft polymers with reactive groups for linking to peptides for use in tissue engineering and to drugs to provide drug delivery systems and useful per se to release amino acids and useful, for example, for wound closure devices, pins, screws, anastomosis rings, and surgical implants, consist essentially of biodegradable homopolymer or copolymer backbone joined at carbon alpha to carbon of backbone carbonyl group, to side chain amino acid pendant group at a carbonyl moiety of said pendant group wherein said side chain contains reactive amino acid group. The graft polymers are prepared by reacting amino acid halide having other reactive groups protected, with biodegradable polymer containing carbanion on carbon alpha to carbon of carbonyl group, and then deprotecting the protected groups. Biodegradable polymer containing carbanion on carbon alpha to carbon of carbonyl group, for use in preparing the graft polymers herein or for otherwise reacting, e.g., for surface crosslinking, attaching nitric oxide derivatives, attaching biochemicals or for grafting hydrophilic or hydrophobic agents to control the hydrophilicity or hydrophobicity, is prepared by reacting biodegradable homopolymer or copolymer containing carbonyl group and carbon alpha to the carbon of the carbonyl group and having H atom on the carbon alpha to group carbonyl carbon, with a base to form carbanion on carbon alpha to carbonyl carbon.

11 Claims, No Drawings

REACTIVE GRAFT POLYMER WITH BIODEGRADABLE POLYMER BACKBONE AND METHOD FOR PREPARING REACTIVE BIODEGRADABLE POLYMERS

TECHNICAL FIELD

This invention is directed to providing reactive biodegradable polymers.

BACKGROUND OF THE INVENTIONS

Biodegradable polymers have been widely investigated for use, e.g., for human body repair and reconstruction, e.g., for surgical sutures and internal bone fixation, for burn wound coverings, and for drug delivery systems.

Recently, investigations have addressed the possibility of providing reactive sites in biodegradable polymers for bonding to biologically active materials, e.g., for bonding to peptides for use in the tissue engineering or for bonding to drugs for delivery to the body.

Barrera, D. A., Macromolecules, 28, 425–432 (1995) describes poly (lactic-co-lysine) where the side-chain amino groups on the lysine residues are reactive to join to cell-adhesion promoting peptide.

Swindler W. S. U.S. Pat. No. 5,219,980 describes a biodegradable polyester with amine containing functional group as a pendant active site, prepared by synthesis of an unsaturated polyester by polycondensation reaction of maleic anhydride with poyol and then reacting the double bonds of the intermediate polymer with an amine by the well-known Michael reaction.

In neither case is the polymer product derived from a starting material biodegradable polymer which is essentially left intact. Furthermore, the pendant side chains are spaced relatively far apart so a high concentration of reactive sites is not possible.

Barrera, et al., cited above, notes that polylactic acid is a versatile, well-characterized material and is one of the few biodegradable materials used clinically but notes that there are no sites available on this material to modify its surface with biologically active moieties.

SUMMARY OF THE INVENTION

It is an object of an embodiment of the invention herein to provide reactive polymers with biodegradable polymer backbone which can be prepared starting with a biodegradable polymer so that the repeating groups of the polymer are essentially left intact for backbones of a variety of chain lengths so that starting biodegradable polymer will largely determine biodegradation, physical, mechanical and thermal properties.

It is an object in the preferred embodiments herein to utilize poly-DL-lactic acid or poly-L-lactic acid or polyglycolic acid or glycolide-lactide copolymer as the backbone.

It is an object of an embodiment herein to provide reactive polymers with side chain amino acid pendant groups.

It is an object in preferred embodiments herein to provide reactive polymers where pendant amino acid side chains are more evenly spaced compared to spacing of amine functional groups in prior art polymers, to provide a high concentration of reactive sites.

It is an object of an embodiment herein to attach side chain amino acid pendant groups to biodegradable polymer backbone at activated site on the backbone.

It as an object of an embodiment herein to provide carbanion on carbon of biodegradable homopolymer or copolymer, which is alpha to carbonyl group, for attachment of amino acid pendant groups at said carbon which is alpha to carbonyl group or for otherwise reacting.

The following embodiments satisfy one or more of the objects stated above.

One embodiment of the invention is directed to a graft polymer having a biodegradable backbone and side chains with reactive amino acid groups, said graft polymer being obtained from a biodegradable homopolymer or copolymer starting material having carbonyl group and carbon alpha to carbon of the carbonyl group and having H atom on carbon alpha to carbonyl carbon and consisting essentially of biodegradable homopolymer or copolymer backbone joined at backbone carbon alpha to backbone carbonyl group, to side chain amino acid pendant group at a carbonyl moiety of said pendant group wherein side chain amino acid pendant group contains reactive amino acid group(s). The biodegradable homopolymer or copolymer starting material and the biodegradable homopolymer or copolymer backbone typically have weight average molecular weights ranging from 2,000 to 500,000, preferably from 20,000 to 150,000. Preferably, the biodegradable homopolymer or copolymer starting material is a biodegradable aliphatic homopolymer or copolymer polyester, most preferably poly-DL-lactic acid or poly-L-lactic acid or polyglycolic acid or is selected from the group consisting of glycolide-lactide copolymers, and the biodegradable homopolymer backbone is a biodegradable aliphatic homopolymer or copolymer polyester backbone, most preferably a poly-DL-lactic acid or poly-L-lactic acid or polyglycolic acid or glycolide-lactide copolymer backbone.

The term "side chain amino acid pendant group" is used herein to mean amino acid with terminating carbonyl group, i.e., carbonyl group that joins to homopolymer or copolymer backbone at backbone carbon alpha to backbone carbonyl group and without hydroxy on carbonyl group that joins to homopolymer or copolymer backbone at backbone carbon alpha to backbone carbonyl group.

The term "reactive amino acid group" is used herein to mean (a) free amine and/or free carboxylic acid functional group on amino acid moiety which can be subsequently reacted to join to peptide or other biochemical (whether obtained from a biological source or synthesized), e.g., growth factors or enzymes or (b) amino acid moiety if there is no subsequent reaction.

The weight average molecular weights referred to are determined by gel permeation chromatography (GPC).

A key to preparing the graft polymers described above is an embodiment herein directed to biodegradable homopolymer or copolymer containing carbonyl group and carbon alpha to the carbonyl group with carbanion on said carbon alpha to carbon of carbonyl group. These polymers with carbanion on carbon alpha to carbon of carbonyl group are highly reactive because of said carbanion. They react at the site of the carbanion to form the graft homopolymers or graft copolymers described above and also to form other products described below. In one embodiment herein, the reactive polymers (i.e., the polymers with carbanion on carbon alpha to carbonyl group) are prepared by reacting biodegradable homopolymer or copolymer having H atom on carbon alpha to carbonyl group carbon with a base to form carbanion on said carbon alpha to carbonyl group carbon.

In an embodiment herein directed to preparing the graft polymers of the invention herein described above, the process for such preparation comprises:

(a) providing amino acid having its amino and any hydroxy or thiol groups or any other non-carboxyl reactive groups protected from reacting in step (b), (b) converting carboxyl group(s) of the protected amino acid provided in step (a) to acyl halide group(s) such as acyl chloride group(s), (c) reacting biodegradable homopolymer or copolymer containing carbonyl group and carbon alpha to the carbon of the carbonyl group and having H atom on the carbon alpha to carbon of the carbonyl group, with a base to form carbanion on carbon alpha to the carbon of the carbonyl group, (d) reacting the reaction products of steps (b) and (c) with each other to join carbonyl moiety of acyl halide group to said carbon alpha to carbon of the carbonyl group, (e) deprotecting the protected groups.

DETAILED DESCRIPTION

We turn now to the embodiment of the invention directed to a graft polymer having a biodegradable backbone and side chains with reactive amino acid groups, said graft polymer being obtained from a biodegradable homopolymer or copolymer starting material having carbonyl group and carbon alpha to carbon of the carbonyl group and H atom on carbon alpha to carbonyl carbon and consisting essentially of biodegradable homopolymer or copolymer backbone joined at backbone carbon alpha to carbon of backbone carbonyl group, to side chain amino acid pendant group at carbonyl moiety of said pendant group wherein side chain amino acid pendant group contains reactive amino acid group(s).

The biodegradable homopolymer or copolymer starting material having carbonyl group and carbon alpha to carbon of the carbonyl group and H atom on carbon alpha to carbonyl carbon is preferably a biodegradable aliphatic homopolymer or copolymer.

Examples of biodegradable aliphatic homopolymer polyesters include poly(alpha-hydroxy $C_1$-$C_5$ alkyl carboxylic acids), e.g., polyglycolic acids, poly-L-glutamates, poly-L-lactides, and poly-D,L-lactides; poly-3-hydroxy butyrate; polyhydroxyvalerate; polycaprolactones, e.g., poly(epsilon-caprolactone); and modified poly(alpha-hydroxyacid)homopolymers, e.g., homopolymers of the cyclic diestermonomer, 3-(S)[alkyloxycarbonyl)methyl]-1,4-dioxane-2,5-dione which has the formula 4 where R is lower alkyl, depicted in Kimura, Y., "Biocompatible polymers," in Biomedical Applications of Polymeric Materials, Tsuruta, T., et al., eds., CRC Press, Ann Arbor, 1993 at page 179. Poly-DL-lactic acid, poly-L-lactic acid and polyglycolic acid are preferred biodegradable aliphatic homopolymer polyesters.

Examples of biodegradable aliphatic copolymer polyesters are glycolide-lactide copolymers, glycolide-caprolactone copolymers, poly-3-hydroxy butyrate-valerate copolymers, and copolymers of the cyclic diester monomer, 3-(S) [(alkyloxycarbonyl)methyl]-1,4-dioxane-2,5-dione, with L-lactide. The glycolide-lactide copolymers include poly(g-lycolide-L-lactide) copolymers formed utilizing a monomer mole ratio of glycolic acid to L-lactic acid ranging from 5:95 to 95:5 and preferably a monomer mole ratio of glycolic acid to L-lactic acid ranging from 45:65 to 95:5, e.g., a monomer mole ratio of glycolic acid to L-lactic acid of 90:10 or a monomer mole ratio of glycolic acid to L-lactic acid of 50:50. The glycolide-caprolactone copolymers include glycolide and epsilon-caprolactone block copolymer, e.g., Monocryl or Poliglecaprone. Other biodegradable aliphatic copolymer polyesters are block copolymers consisting of A and B blocks, where A block is formed from a copolymer having predominant glycolide ester components with any other copolymerizable monomer (e.g., lactide, trimethylene carbonate, p-dioxanone and epsilon-caprolactone) and B block is a random polymer from 1,4-dioxanone-2-one and 1,3-dioxanone-2-one; examples of these block copolymers are sold under the name Biosyn® by U.S. Surgical and are described in U.S. Pat. No. 5,403,347.

Biodegradable aliphatic homopolymer and copolymer polyesters are commercially available, e.g., from Ethicon, Davis & Geck, U.S. Surgical, Medisorb, Birmingham Polymers, Polysciences, Boehringer Ingelheim (Germany) and Purac America. Description of preparation of biodegradable aliphatic homopolymer and copolymer polyesters is set forth in C. C. Chu, "Degradation and Biocompatibility of Synthetic Wound Closure Polymeric Materials," in: Biomedical Applications of Synthetic Biodegradable Polymers, J. Hollinger (Ed.), CRC Press, Boca Raton, Fla., 1995, Chapter 5, pp. 103–128; C. C. Chu, "Biodegradable Polymeric Biomaterials: An Overview," in: Biomedical Engineering handbook, Bronzino, J. D. (Ed-in-Chief), CRC Press, Boca Raton, Fla., (1995), Chapter 44, pp. 611–626; C. C. Chu, "Survey of Clinically Important Wound Closure Biomaterials," in: Biocompatible Polymers, Metals, and Composites, Michael Szycher, Ed., Sponsored by Society for Plastic Engineers, Technomic, Westport, Conn, (1983); and Wise, D. L., Fellmann, T. D., Sanderson, J. E., and Wentworth, R. L., Lactic/glycolic acid polymers, in Drug Carriers in Biology and Medicine, Academic Press, New York, 1979, 237.

Other biodegradable homopolymer or copolymer starting materials having carbonyl group and carbon alpha to carbon of carbonyl group and H atom on carbon alpha to carbonyl carbon are polyanhydrides, for example as described in Tsuruta, T., et al., Biomedical Applications of Polymeric Materials, CRC Press, Ann Arbor, 1993 at page 168, and their copolymers formed by copolymerizing monomers which polymerize to form polyanhydrides and other monomers, having H atom on carbon alpha to carbonyl carbon. Preparation of these is described in Laurencin, C. T., et al., "Poly(anhydrides)," in: Biomedical Applications of Synthetic Biodegradable Polymers, J. Hollinger (Ed.), CRC Press, Boca Raton, Fla., 1995, Chapter 4, pp. 59–102.

The biodegradable homopolymer or copolymer backbone is constituted of repeating groups of the biodegradable homopolymer or copolymer starting material with H atom on carbon alpha to carbonyl carbon, removed.

As indicated above, the biodegradable homopolymer or copolymer starting material and the biodegradable homopolymer or copolymer backbone have weight average molecular weights typically ranging from 2,000 to 500,000, preferably from 20,000 to 150,000.

We turn now to the side chain amino acid pendant groups. As indicated above, these are amino acids with terminating carbonyl group as described above.

The amino acids include, for example, alpha amino acids and beta amino acids.

The alpha amino acids include monocarboxylic monoamino acids, dicarboxylic monoamino acids, polyamino acids and heterocyclic amino acids. Examples of monocarboxylic monoamino acids include glycine, alpha-phenylglycine, alpha-alanine, serine, valine, norvaline, beta-mercaptovaline, threonine, cysteine, leucine, isoleucine, norleucine, N-methylleucine, beta-hydroxy leucine, methionine, phenylalanine, N-methylphenylalanine, pipecolic acid, sarcosine, selenocysteine, tyrosine, 3,5-diiodotyrosine, triiodothyronine, and thyroxine. Examples of monoamino dicarboxylic acids and amides include aspartic acid, beta-methyl aspartic acid, glutamic acid, asparagine, alpha-aminoadipic acid, 4-keto-pipecolic acid, lanthionine, and glutamine. Examples of polyamino acids include ornithine, lysine, 6-N-methyllysine, 5-hydroxylysine, desmosine, arginine and cystine. Examples of heterocyclic amino acids include proline, 4-hydroxyproline and histidine, and tryptophan. Examples of other alpha amino acids are gamma-carboxyglutamate and citrulline. Utilized in the working examples hereinafter are L-lysine, glycine, L-glutamic acid, cystine and aspartic acid.

The beta amino acids include, for example, beta-alanine.

As indicated above, a key to preparing the graft polymers described above is the provision of a biodegradable homopolymer or copolymer with carbanion on carbon alpha to carbonyl group.

The carbanion containing polymer is readily prepared by reacting the biodegradable homopolymer or copolymer starting material described above with a base.

Suitable bases include alkali metal alkoxides, for example, lithium-t-butoxide or sodium ethoxide; alkali metal dialkyl amides, e.g., lithium diisopropylamide; and hydrides, e.g., lithium aluminum hydride, sodium borohydride and sodium hydride. The choice of base depends on the acidity of the hydrogen on the alpha-carbon, i.e., the alpha-hydrogen, of the biodegradable polymer starting material and whether solution or bulk reaction is being carried out. The acidity of the alpha-hydrogen may be derived from theory. For example, the acidity of the alpha-hydrogen of polyglycolide is theoretically predicted to be higher than the acidity of the alpha-hydrogen of polylactide because the alpha-carbon carbanion of polyglycolide is more stable than the alpha-carbon carbanion of polylactide due to the weak electron donating property of the alpha-methyl group in polylactide. A biodegradable polymer starting material with a higher acidity of its alpha-hydrogen requires a less strong base for generating carbanion and vice versa. Appendix 3 of Leonard, J., et al., Advanced Practical Organic Chemistry, Blackie & Professional, New York, 1995, illustrates this. Said Appendix 3 lists the acidity of simple organic compounds (acidity increases in the direction toward the bottom of the table constituting the appendix) and the corresponding bases (basicity increases in the direction toward the top of said table) for deprotonation (i.e., carbanion formation). As indicated in the table, a weak acid requires a strong base. For solution reaction, the base chosen must be compatible with the solvent used to dissolve the starting material polymer. The base is used in an amount ranging from 1 to 15% by weight of the polymer starting material. An increase in the amount of base produces more carbanion sites. When amounts at the top of the range, e.g., 10–15%, are used, the final product will have a lower molecular weight than the biodegradable polymer starting material, thereby enabling use of polymer starting material with a molecular weight normally unsuitable for the utility envisioned, such as drug control release devices.

The selection of whether to use bulk or solution reaction depends on the end use for the reactive polymer formed. For example, in the case of a wound closure suture, bulk reaction is preferred because sutures are in fiber form and commercially obtained sutures composed of biodegradable polymer starting material can constitute the starting material.

Solution reaction may be carried out as follows: The biodegradable homopolymer or copolymer polyester starting material is dissolved in an appropriate solvent, which can be any polar aprotic solvent except for dimethyl sulfoxide or dimethyl formamide, which dissolves the starting material, e.g., methylene chloride for poly-L-lactic acid or tetrahydrofuran for poly-D-L-lactic acid, and the solution is cooled to −20° C. to −79° C., depending on the base used (e.g., if the base needs to be dissolved, the temperature should not be so low as to freeze the solvent) and the stability of the carbanion. Cooling to −72° C. to 79° C. is readily obtained using a dry ice-isopropanol cooling mixture. The base is then added and reaction is allowed to proceed with stirring, for example, for 30 minutes to 5 hours while the temperature is maintained at −20° C. to −79° C. Bulk reaction may be carried out as follows: The biodegradable homopolymer or copolymer starting material is socked in appropriate swelling agent, e.g., tetrahydrofuran, methylene chloride or any aprotic polar solvent to swell the structure for better penetration of base into the interior followed by cooling to −20° C. to −79° C. followed by addition of the base over a period of 30 to 40 minutes and reaction is allowed to proceed with stirring for 30 minutes to 5 hours. Typically, a bulk reaction provides reaction at the surface and subsurface, for surface modification.

As indicated above, the graft polymers of the invention herein are readily prepared by a process comprising the steps of:

(a) providing amino acid having its amino and any hydroxy or thiol groups or any other non-carboxyl reactive groups protected from reacting in step (b), i.e., from reacting with haloacylating agents, (b) converting carboxyl group(s) on the protected amino acid provided in step (a), to acyl halide group(s) such as acyl chloride group(s), (c) reacting biodegradable homopolymer or copolymer containing carbonyl group and carbon alpha to the carbon of the carbonyl group and having H atom on the carbon alpha to carbon of the carbonyl group, with a base to form carbanion on carbon alpha to the carbon of the carbonyl group, (d) reacting the reaction products of steps(b) and (c) with each other to join carbonyl moiety of acyl halide group to said carbon alpha to carbon of the carbonyl group, (e) deprotecting the protected groups.

We turn now to step (a). The amino, hydroxy and thiol groups and any other non-carboxylic acid reactive groups of amino acids are readily protected so they will not react in step (b) by standard procedures for protecting amino, hydroxy and thiol groups and any other non-carboxylic acid reactive groups of amino acids as described in Bodanszky, M., et al., The Practice of Peptide Synthesis, Springer-Verlag, New York, 1984 and in Bodanszky, M., Peptide Chemistry, 2nd revised edition, Springer-Verlag, New York, 1993. Protection against haloacylating agents is preferably provided by reaction of amino acids with 9-fluorenylmethyl chlorocarbonate to provide blocking 9-fluorenylmethyloxycarbonyl group (Fmoc) at the sites to be protected. The reaction with 9-fluorenylmethyl chlorocarbonate is readily carried out in water with anhydrous carbonate salt and polar solvent miscible with water such as dioxane, being used to increase the solubility of the amino acid in water. The reaction is preferably carried out with cooling using an ice-water bath to protect HCl byproduct from reacting with carboxyl groups. Some protected amino acids are available commercially. For example, L-leucine with amino groups protected against chloroacylating agents is available from Sigma.

We turn now to step (b), i.e., converting carboxyl group(s) on the protected amino acid provided in step (a) to acyl halide groups, such as acyl chloride groups. The preferred acylating agent for this purpose is thionyl chloride. Alternatives are phosphorus trichloride, phosphorus pentachloride, carbonyl chloride, thionyl iodide, thionyl bromide and thionyl fluoride. While a stoichiometric amount of acylating agent may be used, a slight excess of acylating agent, e.g., up to 1.025 times stoichiometric, is preferably used. For dicarboxylic acids, both carboxyls can be converted to acyl halide groups provided enough haloacylating agent is used. Thus, by controlling the ratio of haloacylating agent to carboxylic acid, how many carboxyls are converted to acyl halide groups is controlled. Where there are plural carboxylic acid groups, one up to all but one can be protected, e.g., as described in Bodanszky, M., et al., The Practice of Peptide Synthesis, Springer-Verlag, New York, 1984 and in Bodanszky, M., Peptide Chemistry, 2nd revised edition, Springer-Verlag, New York, 1993. Reaction of acylating agent with Fmoc-protected amino acid is readily carried out in chloroform. When thionyl chloride is used as the haloacylating agent, the reaction is preferably heated to 45° to 60° C. and maintained at this temperature for 6 to 10 hours; thereafter maintaining for 10 to 12 hours at room temperature increases the yield.

We turn now to step (c), i.e., the step of reacting biodegradable homopolymer or copolymer containing carbonyl group and carbon alpha to the carbonyl group and having H atom on the carbon alpha to carbon of the carbonyl group, with a base to form carbanion on carbon alpha to the carbon of the carbonyl group. This step is described in detail above.

We turn now to step (d), i.e., the step of reacting the reaction products of steps (b) and (c) with each other to join carbonyl moiety of acyl halide group to said carbon alpha to the carbon of the carbonyl group of the backbone polymer. The carbanion containing polymer in the reaction mixture of step (c) is admixed with protected amino acid halide, the product of step (b), dissolved in the same solvent or swelling agent as is present in step (c) and reaction is carried out for 3 to 4 hours until all the cooling agent from step (c) disappears and hence the temperature is raised to room temperature during the 3 to 4 hour period. This increasing temperature increases the reactivity of the carbanions in the biodegradable starting materials. In the case of dicarboxylic acids where both carboxyls are converted to haloacyl, both haloacyl groups react. For solution reaction, more intramolecular reactions will occur than in the bulk case. Where intermolecular reactions become predominant, intermolecular crosslinking results. An equimolar ratio of the product of step (b) and of the base used to produce the product of step (c) is preferably used in step (d) but a greater amount of the product of step (b) can be used to facilitate completeness, i.e., more sites on the product of step (c) are reacted.

We turn now to step (e), i.e., the step of deprotecting the protected groups. Deprotecting, i.e., removing of protecting groups, is readily carried out by standard procedures as described in Bodanszky, M., et al., the Practice of Peptide Synthesis, cited above. Deprotecting to remove Fmoc is readily carried out by dissolving in dimethyl formamide (or dimethyl sulfoxide) and adding piperidine or triethylamine to react with the -C=0 of the amide group and convert secondary amine to primary amine resulting in $CO_2$ as a byproduct.

Purification is readily carried out by standard purification methods, e.g., washing, dissolution and precipitation.

A reaction scheme for preparing L-lysine modified polylactic acid is shown below wherein LDA stands for lithium diisopropylamide and THF stands for tetrahydrofuran.

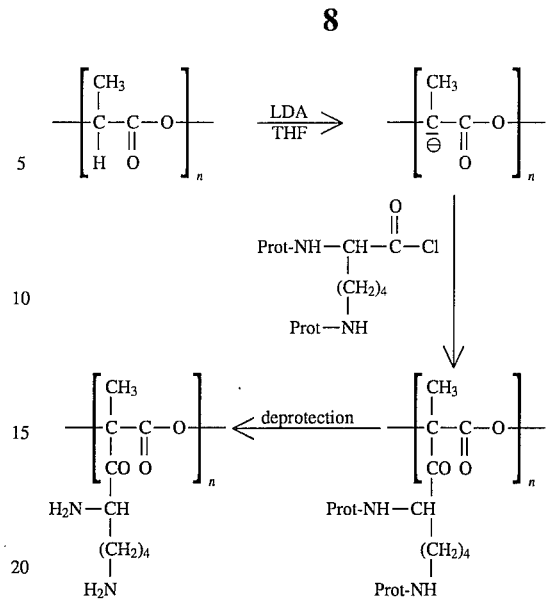

We turn now to the utility of the graft polymers of the invention herein.

For one kind of utility, they may be reacted with peptides for tissue engineering. Peptide attachment to reactive sites for tissue engineering is described in Barrera, D. A., et al., J. Am. Chem Soc. 115, 11010–11011, 1993. Tissue engineering to replace cartilage cells and liver cells is described Cima, L. G., et al., Journal of Biomechanical Engineering, Vol. 113,143–151, 5/91.

For drug dispensing utility, they may be reacted with a drug and implanted in the body at the site where the drug is to be released; the drug is released as the polymer backbone molecules biodegrade. A drug that is suitable for such reaction is 5-fluorouracil. It may be coupled to amino acid grafted polymer, e.g., glycine grafted poly-DL-lactic acid, by reacting the graft polymer with 3-(5-fluorouracil-1-yl-)propanoic acid in dicyclohexylcarbodiimide. Note that polymeric prodrugs releasing 5-fluorouracil have been considered a model system. See Akashi, M., "Polymers for Pharmaceutical and Biomolecular Engineering" in Tsuruta, T., et al., Biomedical Applications of Polymeric Materials, CRC Press, Ann Arbor, 1993, pages 371–375.

The graft polymers herein are also useful per se, i.e., without further chemical reaction, to be fixed at a site in the body for release of amino acids at that site as the polymer backbone molecules biodegrade.

For example, wound closure biomaterials constructed of graft polymers herein will accelerate wound healing by providing L-lysine or other essential amino acids to the wound site directly or locally. For this use, suture material or ligating clips or staples constituted of the biodegradable polymer starting material, e.g., polyglycolic acid, can be converted at least at the surface and subsurface to graft polymer herein. See working Examples III and V hereinafter.

Furthermore, graft polymers herein where the side chains are derived from lysine or hydroxylysine will promote the regeneration of bony defects since the epsilon amino groups in lysine and hydroxylysine are known to be essential to the calcification mechanism. See Peacock, E. E., et al., Wound Repair, 2d edition, W. B. Saunders Company, Philadelphia, 1976 at page 564.

We turn now to utility of the polymers with carbanion on carbon alpha to carbon of carbonyl group. As indicated above, these are useful to form the graft polymers herein. They are also useful to react as follows:

(1) For surface crosslinking of the polymers to control their biodegradation rate for wound closure, vascular grafts, surgical meshes, surgical implants, composite bone plates, pins, screws, anastomosis rings, drug control release devices and tissue engineering.

(2) For reaction with oxycarbonyl containing spin label at carbanion sites, to attach more aminoxyl-containing radicals than if carbanion were not present. (See Lee, et al., U.S. Pat. No. 5,516,881).

(3) For attachment to the polymers at the carbanion sites of hydrophilic or hydrophobic agents to adjust the hydrophilicity or hydrophobicity of the polymers.

(4) For attachment to the polymers at the carbanion sites, of drugs, peptides, growth factors or any biochemicals that could act as electrophilic agents to make the polymers more biologically active.

A scheme for attaching 5-fluorouracil (5-FU) to polymer with carbanion on carbon alpha to carbon of carbonyl group follows: 5-Fluorouracil is reacted with ethyl acrylate in alcohol in the presence of sodium to form N-2-acryloyloxy-ethyl-5-fluorouracil which is reacted with 3N HCl to convert the ester group to a carboxyl group and then with thionyl chloride to form the acid chloride which is reacted with the carbanion sites of the polymer with carbanion on carbon alpha to carbon of carbonyl group, to form graft polymer with side chains containing 5-FU linked to polyester alpha carbon by an acetyl moiety.

The invention herein is illustrated by the following specific examples.

EXAMPLE I

L-lysine (1.42 g, 9 mmol) was dissolved in a 10% solution of $Na_2CO_3$ in double distilled water (50 ml, 50 mmol). Dioxane (25 ml) was added and the mixture was stirred in an ice-water bath. 9-Fluorenylmethyl chlorocarbonate (5 g, 19 mmol) was added in small portions and stirring was continued at ice-water bath temperature for 4 hours and then at room temperature for 8 hours. The reaction mixture was poured into double distilled water (800 ml) and extracted with ether (200 ml in two porticos). The aqueous solution was cooled in an ice-water bath and acidified under vigorous stirring with concentrated hydrochloric acid to Congo. The mixture was stored in a refrigerator overnight, filtered and the solid product thoroughly washed with water. The dry product (3 g, 5.1 mmol) was dissolved in 300 ml of chloroform and then 0.40 ml. (0.65 g, 5.5 mmol) of thionyl chloride was added to the reaction solution. This reaction was heated to 60° C. for 8 hours then left at room temperature overnight. The solvent was evaporated under vacuum using rotary evaporator. Next, 0.44 g (0.6 mmol) of poly-DL-lactic acid (PDLLA) having an inherent viscosity of about 0.36 as determined at 25° C. by a standard viscometric method, and a weight average molecular weight of about 77,000 obtained from Medisorb was placed into a 250 ml three-necked flask which was equipped with magnetic stirrer, nitrogen gas inlet, stopper, and serum cap. After addition of 100 ml of dry tetrahydrofuran (THF), the solution was cooled to −78° C. by means of a dry ice-isopropanol cooling mixture. 0.15 ml of 2.0M lithium diisopropylamide (LDA) solution in heptane/THF/ethyl benzene (0.3 mmol) was syringed in; then the solution was stirred for 8 hours at −78° C. A solution of 0.37 g of N,N'-bis-Fmoc-L-lysine acid chloride (0.6 mmol) in THF (20 ml) was syringed in and the combination was allowed to stand for 3 hours with stirring at room temperature. The resulting product was poured into 500 ml of cold hexane for precipitation, washed with more hexane and dried in a vacuum oven. In order to deprotect N-terminals of grafted L-lysine, 0.2 g of resulting product was dissolved in 20 ml of THF. Then, 0.6 ml of piperidine was added and stirring was continued for 4 hours at ice-water temperature. The mixture was poured into excess cold hexane for precipitation, washed with more cold hexane and the residue was dried in a vacuum oven.

EXAMPLE II

L-lysine (1.42 g, 9 mmol) was dissolved in a 10% solution of $Na_2CO_3$ in double distilled water (50 ml, 50 mmol). Dioxane (25 ml) was added and the mixture was stirred in an ice-water bath. 9-Fluorenylmethyl chlorocarbonate (5 g, 19 mmol) was added in small portions and stirring was continued at ice-water bath temperature for 4 hours and then at room temperature for 8 hours. The reaction mixture was poured into double distilled water (565 ml) and extracted with ether (200 ml in two portions). The aqueous solution was cooled in an ice-water bath and acidified under vigorous stirring with concentrated hydrochloric acid to Congo. The mixture was stored in a refrigerator overnight, filtered and the solid product thoroughly washed with water. The dry product (3 g, 5.1 mmol) was dissolved in 300 ml of chloroform and then 0.40 ml (0.65 g, 5.5 mmol) of thionyl chloride was added to the reaction solution. The reaction mixture was heated to 60° C. for 8 hours then left at room temperature overnight. The solvent was evaporated under vacuum using rotary evaporator. Next, 0.49 g (0.6 mmol) of poly-L-lactic acid (PLLA) having an inherent viscosity of about 0.5 as determined at 25° C. by a standard viscometric method, and weight average molecular weight of 110,000, from Medisorb, was placed into a 250 ml three-necked flask which was equipped with magnetic stirrer, nitrogen gas inlet, stopper, and serum cap. After addition of 100 ml of distilled methylene chloride (MC), the solution was cooled to −78° C. by means of a dry ice-isopropanol cooling mixture. 0.3 ml of 1M lithium-t-butoxide in THF (0.3 mmol) was syringed in; then the solution was stirred for 8 hours at −78° C. A solution of 0.37 g of N,N'-bis-Fmoc-L-lysine acid chloride (0.6 mmol) in MC (20 ml) was syringed in and allow to stand for 12 hours with stirring at room temperature. The resulting product was poured into 500 ml of cold hexane for precipitation, washed with more hexane and dried in a vacuum oven. In order to deprotect N-terminals of grafted L-lysine, 0.2 of resulting product was dissolved in 20 ml of THF. Then, 0.6 ml of piperidine was added and stirring was continued for 4 hours at ice-water temperature. The mixture was poured into excess of cold hexane for precipitation, washed with more cold hexane and the residue was dried in a vacuum oven.

EXAMPLE III

DL-Glutamic acid (1.47 g, 0.010 mol) is dissolved in a 10% solution of $Na_2CO_3$ in water (26.5 ml, 0.025 mol). Dioxane (15 ml) is added and the mixture is stirred in ice-water bath. 9-Fluorenylmethyl chlorocarbonate (Fmoc) (2.6 g, 0.010 mol) is added in small portions and stirring is continued at 0° C. for 4 hours and for another 8 hours at room temperature. The reaction mixture is poured into water (600 ml) and extracted with ether (200 ml in two portions). The aqueous solution is cooled in an ice-water bath and acidified under vigorous stirring with concentrated hydrochloric acid to pH of about 3. The mixture is stored in a refrigerator overnight, filtered and the solid material thoroughly washed in water. The product is then dried in a vacuum oven at 40° C. for 24 hours. This reaction has a yield of around 90%.

Fmoc-glutamic acid (1.9 g, 0.00271 mol) is dissolved in chloroform (1000 ml). The amount of chloroform required depends on the solubility of the cross-linking agent. An equimolar Fmoc-cystine requires double the amount of chloroform, 2000 ml. Once the solid has all dissolved, $SOCl_2$ in injected (0.395 ml, 0.00542 mol) and the mixture is heated to 60° C. Heating is continued at this temperature for 8 hours; then the mixture is left at room temperature overnight. Chloroform is evaporated off and solid is dried further in a vacuum-oven for 24 hours at 40° C. The yield for this reaction is about 75%.

DEXON suture fibers from Davis/Geck prepared from polyglycolic acid having an inherent viscosity of about 1.3 as determined at 25° C. by a standard viscometric method, are socked in dry tetrahydrofuran (THF) for 1 hour at room temperature to allow swelling. Next, the THF with fibers therein is purged by nitrogen gas to remove any moisture and cooled to −79° C. with dry-ice/isopropanol. Then, 5% (wt/wt) lithium diisopropylamide (LDA) over fiber is injected into the mixture for 1 hour. Then, a solution of the Fmoc-glutamic acid chloride dissolved in THF is injected in the mixture and stirred for 3 hours at room temperature.

After 3 hours, the fibers are taken out the reaction vessel and gently washed with pure THF in order to remove any residuals of outside of fibers. The fibers are added to 1:4 mixture (vol %) of piperidine and THF. The mixture is stirred in ice-water bath for 1 hour. After reaction of 1 hour, the fiber are also washed with pure THF again and dried in vacuum for overnight for further analysis and characterization.

EXAMPLE IV

The Fmoc-glycine (1 g, 3.4 mmol), obtained from Sigma, was dissolved in 100 ml of chloroform and then 0.87 ml (4.0 mmol) of thionyl chloride was added to the reaction solution. This reaction was heated to 60° C. for 8 hours then left at room temperature overnight. The solvent was evaporated under vacuum using a rotary evaporator. Next, 0.44 g (0.6 mmol) of poly-DL-lactic acid (PDLLA) having an inherent viscosity of about 0.7 as determined at 25° C. by a standard viscometric method, and a weight average molecular weight about 110,000, from Medisorb, was placed into a 250 ml three-necked flask which was equipped with magnetic stirrer, nitrogen gas inlet, stopper, and serum cap. After addition of 50 ml of dry THF, the solution was cooled to −78° C. by means of a dry ice/isopropanol mixture. 0.15 ml of 2.0M lithium diisopropylamide solution in heptane/THF/ethylbenzene (3.0 mmol) was syringed in; then the solution was stirred for one 1 hour at −78° C. A solution of 0.095 g of Fmoc-glycine acid chloride (3.0 mmol) in THF (5 ml) was syringed in and allowed to stand for 3 hours with stirring at room temperature. The resulting product was poured into 300 ml of cold hexane for precipitation, washed with more hexane and dried in a vacuum oven. The deprotection of the N-terminals of the grafted glycine was carried out by dissolving 0.5 g of the F-moc-glycine grafted PDLLA in 20 ml of N,N-dimethylformamide (DMF). 5 ml of piperidine or triethylamine was then added into the above solution and stirred for 2 hours at room temperature. The mixture was poured into excess of diethyl ether. The residue was dried in a vacuum oven.

EXAMPLE V

D,L-Cystine (2.403 g, 0.01 mole) is dissolved in a 10% solution of $Na_2CO_3$ in water (50 ml). Dioxane (30 ml) is added and the mixture is stirred in an ice-water bath. 9-Fluorenylmethyl chlorocarbonate (Fmoc) (5.17 g, 0.02 mole) is added in small portions and stirring is continued at ice-bath temperature for 4 hours and for 8 hours at room temperature. The reaction mixture is poured into water (1 L) and extracted with ethyl ether (300 ml in two portions). The aqueous solution is cooled in an ice bath and acidified under vigorous stirring with concentrated HCl to Congo color (pH=2–3). The mixture is stored in a refrigerator overnight, and filtered and solid materials thoroughly washed in water three times. The product is then dried in a vacuum oven at 40° C. for 24 hours. This reaction has a yield of about 86%.

Fmoc-Cystine (4 g, 0.005841 mole) is dissolved in chloroform (2000 ml). The amount of solvent required depends on the solubility of the amino acid. In some cases, raising the temperature is needed to dissolve the solid Fmoc-cystine. Once the solid has all dissolved, a slight excess of $SOCl_2$ is injected (0.44 ml, 0.006 mole) and the mixture is heated up to 60° C. for 8 hours. Then, the mixture is left at room temperature overnight. Solvent is evaporated off and the solid dried further in a vacuum oven for 24 hours at 40° C. The yield for this reaction is 80%.

DEXON suture fibers from Davis/Geck, as described in Example III, are socked in dry tetrahydrofuran (THF) for 1 hour at room temperature to allow swelling. Next, the TFH with fibers therein is purged by nitrogen gas to remove any moisture and cooled to −79° C. with dry-ice/isopropanol. Then, 5% (wt/wt) lithium diisopropylamide (LDA) over fiber is injected into the mixture for 1 hour. Then, a solution of the Fmoc-Cystine dissolved in THF is injected in the mixture and stirred for 3 hours at room temperature.

After 3 hours, the fibers are removed from the reaction vessel and gently washed with pure THF in order to remove any residuals of outside of fibers. The fibers are added to a 1:4 mixture (vol %) of piperidine and THF. The mixture is stirred in an ice-water bath for 1 hour. After reaction for 1 hour, the fibers are washed with pure THF again and dried in vacuum overnight for further analysis and characterization.

Variations will be evident to those skilled in the art. Therefore, the scope of the invention is determined by the claims.

What is claimed is:

1. Graft polymer having a biodegradable backbone and side chains with reactive amino acid groups and/or protected amino acid groups, said graft polymer being obtained from a biodegradable homopolymer or copolymer starting material having carbonyl group and carbon alpha to carbon of the carbonyl group and having H atom on carbon alpha to carbonyl carbon and consisting essentially of biodegradable homopolymer or copolymer backbone joined at backbone carbon alpha to backbone carbonyl group, to side chain amino acid pendant group at a carbonyl moiety of said pendant group, which side chain amino acid pendant group contains reactive amino acid group(s) and/or protected amino acid groups.

2. The graft polymer of claim 1 wherein the biodegradable homopolymer or copolymer backbone has a weight average molecular weight ranging from 2,000 to 500,000.

3. The graft polymer of claim 2 wherein the biodegradable homopolymer or copolymer backbone is a biodegradable aliphatic homopolymer or copolymer polyester backbone.

4. The graft copolymer of claim 3 wherein said biodegradable aliphatic homopolymer or copolymer polyester backbone is a poly-L-lactic acid or poly-DL-lactic acid or polyglycolic acid or glycolide-lactide copolymer or glycolide-epsilon-caprolactone copolymer or glycolide-trimethylene carbonate copolymer backbone.

5. The graft copolymer of claim 4 wherein the side chain amino acid pendant group is selected from the group consisting of L-lysine, glycine, L-glutamic acid, cystine and aspartic acid, wherein hydroxy is removed from carboxyl group to provide said carbonyl moiety of said pendant group.

6. The graft copolymer of claim 1 wherein the side chain amino acid pendant group is selected from the group consisting L-lysine, glycine, L-glutamic acid, cystine and aspartic acid wherein hydroxy is removed from carboxyl group to provide said carbonyl moiety of said pendant group.

7. A process for preparing the graft polymer of claim 1, said process comprising the steps of:

(a) providing amino acid having any non-carboxyl reactive groups protected from reacting in step (b), (b) converting carboxyl group(s) of the protected amino acid provided step (a) to acyl halide groups(s), (c) reacting biodegradable homopolymer or copolymer containing carbonyl group and carbon alpha to the carbon of the carbonyl group and having H atom on the carbon alpha to carbon of the carbonyl group, with a base to form carbanion on carbon alpha to the carbon of the carbonyl group, (d) reacting the reaction products of steps (b) and (c) with each other to join carbonyl moiety of acyl halide group to said carbon alpha to carbon of the carbonyl group, (e) deprotecting the protected groups.

8. The process of claim 7 wherein the base is selected from the group consisting of alkali metal alkoxides, alkali metal dialkylamides and hydrides.

9. A process for preparing a reactive biodegradable homopolymer or copolymer comprising the step of reacting biodegradable homopolymer or copolymer containing carbonyl group and carbon alpha to the carbon of the carbonyl group and having H atom on the carbon alpha to the carbon of the carbonyl group, with a base to form carbanion on carbon alpha to the carbon of the carbonyl group.

10. The process of claim 9 wherein the base is selected from the group consisting of alkali metal alkoxides, alkali metal dialkylamides and hydrides.

11. Biodegradable homopolymer or copolymer containing carbonyl group and carbon alpha to the carbonyl group and having carbanion on the carbon alpha to the carbon of the carbonyl group.

* * * * *